Oct. 10, 1961  N. B. KELL  3,003,592
BRAKE ADJUSTER
Filed Oct. 28, 1959
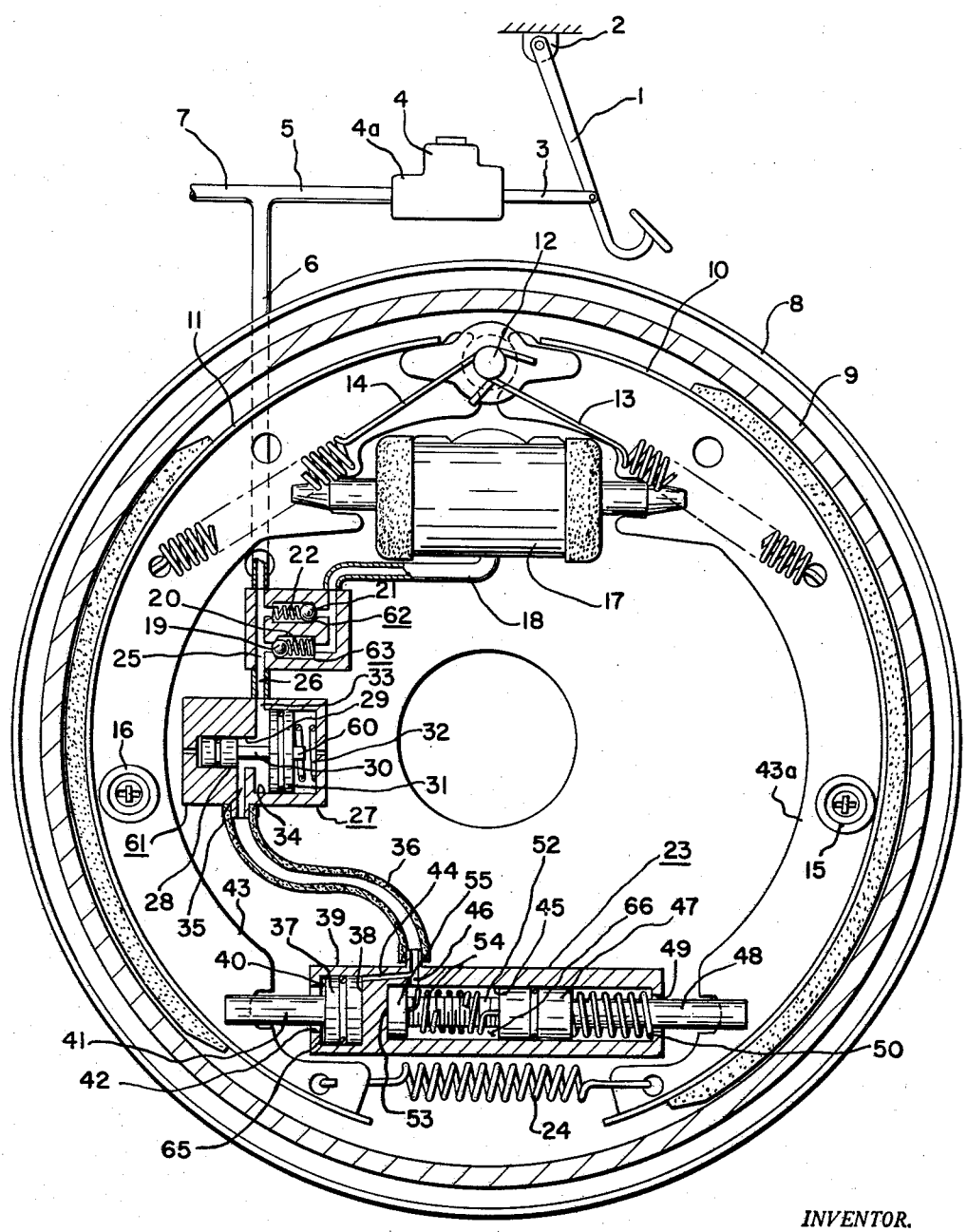
INVENTOR.
Nathaniel B. Kell
BY
His Attorney

United States Patent Office 3,003,592
Patented Oct. 10, 1961

3,003,592
BRAKE ADJUSTER
Nathaniel B. Kell, Indianapolis, Ind., assignor to General Motors Corporation, Detroit, Mich., a corporation of Delaware
Filed Oct. 28, 1959, Ser. No. 849,206
8 Claims. (Cl. 188—79.5)

This invention relates to a vehicle drum brake and more particularly to an automatic adjuster for the drum brake.

The conventional vehicle drum brake requires adjustment to provide the necessary clearance between the brake shoes and the rotating brake drum. This adjustment is usually provided through a manual means and made by a repair man or servicemen for the motor vehicle. If an automatic adjusting means could be provided with the vehicle brake it would eliminate the need for periodic adjustment of the vehicle brakes. It would also provide a proper adjustment for proper operation of the vehicle brake at all times.

Accordingly, this invention is intended to provide this type of a brake adjuster. The brake adjuster is intended to cooperate with a conventional hydraulic drum brake.

It is an object of this invention to provide a hydraulic means for providing clearance between the brake shoes and the brake drum by a hydraulically extensible adjusting strut in combination with a hydraulically operated vehicle drum brake.

It is another object of this invention to provide an automatic brake adjusting means for operation with a conventional hydraulic vehicle drum brake requiring a minimum of changes to adapt the brake adjuster to the conventional hydraulic brake.

It is a further object of this invention to provide a means for hydraulically retaining a clearance between the brake shoes and the brake drum by a hydraulically extensible adjusting strut having a prewound coil spring to extend the adjustable strut to the desired length in providing the brake adjustment within a hydraulic vehicle drum brake.

The objects of this invention are accomplished by providing a conduit means leading to a hydraulically extensible strut between two cooperative adjacent ends of the brake shoes. The brake shoes operate within a conventional brake drum. The conduit leading to the hydraulically extensible strut is provided with a two way check valve in the conduit leading to the hydraulic wheel cylinder. A cutoff valve which provides a limiting pressure in the adjusting strut is also placed within the conduit means leading to the hydraulically extensible strut. The hydraulically extensible strut contains two pistons. One piston permits the clearance between the brake shoes and the brake drum in the retracted position. The second piston, the wear compensating piston, operates in cooperation with a bolt which is threadedly engaging the second piston. This bolt is connected to a prewound coil spring which automatically extends the bolt relative to the second piston when any clearance exists between the end of the cylinder for the second piston and the bolt head.

In this manner the clearance holding piston retains a predetermined clearance between the brake shoes and the brake drum. The wear compensating piston operates to permit the coil spring to extend the bolt relative to the wear compensating piston thereby compensating for wear in extending the hydraulically extensible strut. A constant clearance is maintained between the brake shoes and the brake drum.

The adjustment is made on the initial part of the hydraulic brake actuating stroke. Subsequent to the initial brake adjustment the hydraulic wheel cylinder is then actuated and, accordingly, the brakes are actuated.

Further objects and advantages of the present invention will be apparent from the following description, reference being had to the accompanying drawing, wherein preferred embodiments of the present invention are clearly shown.

In the drawing:

The drawing illustrates a cross section view of the brake adjusting structure showing the relative positions of the valves and the hydraulically extensible strut.

The brake adjusting means illustrated in the drawing may be operated in combination with a conventional vehicle drum brake with minor alterations to accommodate the brake adjuster. The brake adjuster may be installed in each of the plurality of wheels on the motor vehicle. This provides an adjustment on all wheels as the vehicle brakes are operated.

The brake pedal 1 is pivotally mounted on the chassis 2 and pivotally operates a push rod 3. The push rod 3 extends into the master cylinder 4a to operate the master piston, not shown, for pressurization of fluid within a hydraulic brake fluid system. The master cylinder 4a is provided with the conventional reservoir 4. The master cylinder 4a is in communication with the conduit 5 which leads into the vehicle drum brake shown through conduit 6. The conduit 7 is also in communication with conduit 5 and leads to the other of the plurality of brakes on the motor vehicle.

The backing plate 8 provides a mounting means for the braking structure. The brake drum 9 is rotatably mounted concentric with the backing plate 8. The brake shoe 10 and the brake shoe 11 are mounted for frictionally engaging the inner periphery of the rotating brake drum 9. The brake shoes 10 and 11 are biased to a contacting position on the anchor pin 12 by the retraction springs 13 and 14.

The hold-down pin assembly 15 is connected to the brake shoe 10. A similar hold-down spring 16 is provided for the brake shoe 11.

The two ends of the brake shoes 10 and 11 are actuated by means of a hydraulic wheel cylinder 17 which is mounted on the backing plate 8 and has push rods for engaging the brake shoes. The hydraulic wheel cylinder 17 is provided with a conduit means 18 in communication with the conduit 6. In the connection between the conduits 6 and 18 a check valve means is provided. The inlet check valve comprises a ball 19 and a spring 20 seated within the passage means. The ball 19 seats on the passage opening and requires a predetermined pressure for opening of the valve in the actuating of the hydraulic wheel cylinder 17.

The return check valve means includes a ball 21 and a spring 22 biasing the ball 21 to seat on the passage opening. The return check valve maintains a residual pressure within the hydraulic wheel cylinder 17. In this manner the hydraulic wheel cylinder 17 is actuated when the predetermined pressure exists in the conduit 6. The return check valve 21 retains a residual pressure within the hydraulic wheel cylinder 17, however, this pressure is low enough to permit the retraction of the brake shoes by the springs 13 and 14.

A hydraulically extensible strut 23 is positioned between the opposite two cooperative adjacent ends of the brake shoes 10 and 11. The ends of the extensible strut 23 receive the webbing of the brake shoes 10 and 11. A constant contact is maintained between the two cooperative adjacent ends and the strut 23 by the biasing force of the spring 24.

A passage 25 is in communication with the conduit means 6. The passage means 25 extends through the check valve assembly to connect the conduit 26. The conduit 26 is connected to the pressure limiting valve 27. The pressure limiting valve 27 includes a valve element 28 operating within a cylinder 29. The valve element 28 is connected by a stem 30 to the valve piston 31. The valve piston 31 is biased to a normally open position by the spring 32.

The passage 33 is in communication with the conduit 26 to place the cylinder 34 in communciation with the conduit means 26. A valve passage 35 is offset from the passage 33 and is controlled by the valve element 28. The valve passage 35 is connected to the hydraulically extensible strut 23 by a flexible hose 36.

The pressure limiting valve 27 is operated by the piston 31 which is biased to a normally open position by the spring 32. With an increase in pressure within the passage 33 and cylinder 34 the piston 31 is biased to compress the spring 32 thereby closing the valve passage 35 and limiting the pressure within the hose 36.

The hydraulically extensible strut 23 includes two piston assemblies. The larger piston 37 is the clearance holding piston and the piston 37 is shown in its normally retracted position with a clearance between the brake shoes and the brake drum. In this position the right hand end of the clearance holding piston 37 contacts the wall 38 of the cylinder 39. This provides a clearance 40 between the left hand end of the clearance holding piston 37 and the left hand end of the cylinder 39. A push rod 41 extends through the opening 42 to receive the webbing 43 of the brake shoe 11.

During initial operation of the vehicle brakes the pressure within the passage 44 pressurizes the fluid between the right hand end of the piston 37 and the wall 38. This, in turn, biases the piston 37 to contact the left hand end of the cylinder 39 providing a clearance between the piston 37 and the wall 38.

The right hand end of the extensible strut 23 includes a cylinder 45 concentric with the cylinder 39 and formed with an integral structure. The cylinder 45 is provided with a passage 46 in communication with the hose 36. The passage 46 extends into the cylinder 45.

The cylinder 45 receives a piston 47. The piston 47 is provided with a push rod 48 which extends through the opening 49 in the cylinder 45. The push rod 48 receives the webbing 43a of the brake shoe 10. The piston 47 is biased to the left position within the cylinder 45 by the spring 50.

The piston 47 is provided with a hollow cylindrical threaded portion on its left end for the reception of the screw 52. The screw 52 extends inwardly to the position where head 55 of the screw 52 contacts wall 53 within the cylinder 45. A torsion spring 54 engages the head 55 of the screw 52. The opposite end of the spring 54 engages the piston 47. The torsion spring 54 is prewound to bias the screw 52 to an extending movement when a clearance exists between the wall 53 and the head 55. In this manner when a clearance exists between the head 55 and the wall 53 the screw 52 extends from the piston 47 thereby providing a brake adjustment.

The device operates in the following described manner. The brake adjusting device is intended to be operated with the conventional hydraulic vehicle drum brake. In a conventional vehicle drum brake, the master cylinder, as indicated by 4a, generally has a check valve to maintain a residual pressure within the system. This is primarily intended to retain fluid within the system and provide a minimum of movement of the brake pedal in actuating of the vehicle brakes. The residual pressure will not effect the operation of the brake adjuster. The limiting valve 61 is provided with a spring 32 of such a strength that the valve will normally be held in an open position as shown in the drawings. The spring 24 will maintain the piston 37 and the piston 47 in a normally retracted position as shown in the drawing. With the various parts of the brake adjuster in the relative positions as shown, the conduit 6 is in communication with a hydraulically extensible strut 23.

As the pedal 1 is depressed fluid is pressurized within the master cylinder 4a by a hydraulic master piston, not shown. The pressurized fluid in the conduits 5 and 6 is in communication with the inlet check valve 63 and the outlet check valve 62. The pressure, however, is not great enough to actuate the inlet check valve 63. The pressurized fluid enters the pressure limiting valve 27 and passes through the passages 33 and 35. The fluid is also pressurized in the hose 36, the passages 44 and 46. The pressurized fluid within the cylinder 39 and the cylinder 45 acts on the pistons 47 and 37. Due to the fact that the piston 37 is of a larger diameter the clearance holding piston 37 will be actuated first. The clearance holding piston 37 moves relative to the cylinder 39 and contacts the wall 65. The stroke of the clearance holding piston 37 is predetermined to equal the brake operating clearance required between the brake shoes and the brake drum.

Upon an increase in pressure the wear compensating piston 47 is biased to an extended position by the pressurized fluid within the chamber 66. The wear compensating piston 47 moves to an extended position relative to the piston 37 if there is brake shoe wear resulting in a clearance beyond a normal operating clearance between the brake shoes and the brake drum. As the piston 47 extends relative to the cylinder 45, the bolt head 55 of the screw 52 moves away from the wall 53 in the end of the cylinder 45. The torsion spring 54 is prewound and connected to the bolt head 55 and the piston 47. With a clearance existing between the head 55 and the wall 53 the torsion force of the spring 54 rotates the screw 52 relative to the piston 47. This rotation of the screw in its threaded engagement with the piston 47 extends the screw 52 until the head 55 contacts the wall 53. In this manner excess clearance between the brake shoes and the brake drum is eliminated as the screw extends relative to the wear compensating piston 47.

When the brake shoes 10 and 11 contact the brake drum 9 further movement of the clearance holding piston 37 and the wear compensating piston 47 is resisted. Any increase in pressure does not affect the hydraulically extensible strut 23 beyond this point. An increase in pressure in the cylinder biases the piston 31 of the pressure limiting valve 27. The piston 31 is biased to compress the spring 32 thereby closing the passage 35 by the valve 28. In this position the pressure in the extensible strut is limited to the pressure existing at this point.

Any further rise in pressure in the hydraulic fluid brake actuating system unseats the ball 19 of the inlet check valve 63. The pressurized fluid passes the ball check 19 and enters the hydraulic wheel cylinder 17 through the conduit 18. The pressurized fluid within the hydraulic wheel cylinder 17 forces the ends of the brake shoes until they contact the rotating brake drum 9. In this position the brake shoes 10 and 11 are frictionally engaging the inner periphery of the rotating brake drum 9 as the brakes are actuated.

Releasing of the brake through the pedal 1 reduces the pressure within the conventional master cylinder 4a by permitting the conventional master piston to return with the push rod 3. The reduced pressure within the conduit 6 permits the pressure within the conduit 18 to pass through the return check valve 62. The fluid in the conduit 18 unseats the ball 21 from the seat in the return check valve 62. The fluid then passes through conduit 6 into the master cylinder 4a. With a reduced pressure within the hydraulic brake fluid actuating system the pressure limiting valve 27 also shifts to the normally open position as shown in the drawing. The spring 32 biases piston 31 to carry the valve 28 to a normally open position. In the open position the passage 35 again opens and the extensible strut 23 is in communication with the master cylinder 4 through the conduits and passages as shown. With a reduced pressure in the chamber 66 the wear compensating piston 47 is biased by the spring 50 to seat the head 55 of screw 52 firmly against the end wall 53 of the cylinder 45. The screw 52 is adjusted relative to the piston 47 and is retained in this position as the brakes are released.

With a further reduction in pressure within the chamber adjacent the wall 38 the clearance holding piston 37 is permitted to seat itself on the wall 38 of the cylinder 39. The retraction of the clearance holding piston 37 in the cylinder 39 is accomplished by the biasing effect of the spring 24 between the two cooperative adjacent ends of the brake shoes 10 and 11. In this position the brake shoes are adjusted to the proper clearance relative to the rotating brake drum. The brake shoes, again, are in their retracted position due to the biasing effect of the spring 24 and the retraction springs 13 and 14.

If no excess clearance exists between the brake shoes and the rotating brake drum, no adjustment is made during the braking cycle. It is only when an excess of clearance exists between the brake shoes that the adjustable strut operates during the braking cycle. It is noted that the clearance holding piston 37 is provided with a clearance between its outer end and the wall 65. This clearance may be any predetermined distance to accommodate excessive heating within the braking structure. The clearance is automatically maintained between the two cooperative adjacent ends of the brake shoes regardless of the amount of adjustment required within the braking structure.

While the embodiments of the invention as herein disclosed constitutes preferred forms, it is to be understood that other forms might be adopted.

What is claimed is as follows:

1. An automatic brake adjuster for use in a hydraulically operated vehicle drum brake comprising in combination, a hydraulic fluid brake actuating system, means for pressurizing fluid within said fluid system, a vehicle drum brake having a brake drum, brake shoes for frictionally engaging said brake drum, and hydraulic means for engaging said brake shoes with said brake drum in communication with said hydraulic fluid brake actuating system, an automatic brake adjuster for use with said vehicle drum brake including a hydraulically extensible strut positioned between two cooperative adjacent ends of said brake shoes, a spring connected to the two cooperative adjacent ends of said brake shoes to maintain contact between said brake shoes and said hydraulically extensible strut, a clearance holding piston within said hydraulically extensible strut having a fluid chamber, a push rod connecting said clearance holding piston with the first of said two cooperative adjacent ends of said brake shoes, a wear compensating piston within said hydraulically extensible strut having an adjustable screw, said adjustable screw having means for extension relative to said wear compensating piston, a second push rod connecting said wear compensating piston with said second of said two cooperative adjacent ends of said brake shoes, conduit means from said hydraulically extensible strut to said hydraulic fluid brake actuating system, a pressure limiting valve in said conduit means to limit the pressure within said hydraulically extensible strut, a two-way check valve in the conduit means in said hydraulic brake fluid actuating system in communication with said fluid pressurizing means to retard the actuation of the vehicle brakes to a time subsequent to the operation of said adjustable strut.

2. An automatic brake adjuster for operation in a hydraulically operated vehicle drum brake comprising in combination, a vehicle drum brake having a brake drum with brake shoes for frictionally engaging said brake drum, a hydraulic fluid brake actuating system, means for pressurizing fluid in said hydraulic fluid brake actuating system, a hydraulic means for actuating said brake shoes in communication with said hydraulic fluid brake actuating system, an automatic brake adjuster for use with said vehicle drum brake including a two-way check valve in passage means connecting said hydraulic actuating means with said hydraulic fluid brake actuating system, a hydraulically extensible strut, conduit means connecting said hydraulic fluid brake actuating system with said hydraulically extensible strut, a pressure limiting valve in said conduit means connecting said hydraulic fluid brake actuating system with said hydraulically extensible strut, a clearance holding piston mounted concentrically within said hydraulically extensible strut forming a fluid chamber in communication with said fluid brake actuating system, means of connecting said clearance holding piston with the first of said brake shoes, a wear compensating piston mounted concentrically with said hydraulically extensible strut and forming a second chamber in communication with said hydraulic fluid brake actuating system, means connecting said wear compensating piston with the second of said brake shoes said hydraulically extensible strut positioned between said brake shoes and having resilient means for maintaining contact between said brake shoes and said hydraulically extensible strut, a screw member threadably engaging said wear compensating piston, a torsion spring mounted on said screw member to bias said screw member to an extended position relative to said wear compensating piston when an excessive clearance exists between said brake shoes and said brake drum during the actuation of said vehicle brakes.

3. A brake adjuster for operation in a hydraulically operated vehicle drum brake comprising in combination, a vehicle drum brake including brake shoes for frictionally engaging a vehicle brake drum, a hydraulic fluid brake actuating system, means for pressuring fluid in said hydraulic fluid brake actuating system, hydraulic means positioned between the ends of said two brake shoes for frictionally engaging said brake shoes with said brake drum, conduit means connecting said hydraulic fluid brake actuating system with said hydraulic means positioned between said brake shoes, check valve means for inlet and outlet passage of hydraulic fluid in said connecting conduit means, a brake adjuster for operation with said drum brake including a hydraulically extensible strut positioned between two cooperative adjacent ends of said brake shoes, retraction means positioned between said two cooperative adjacent ends of said brake shoe for maintaining a biasing force through said brake shoes on the opposite ends of said hydraulically extensible strut, conduit means connecting said hydraulically extensible strut with said hydraulic fluid brake actuating system, a pressure limiting valve in said conduit means connecting said hydraulically extensible strut with said hydraulic fluid brake actuating system, a clearance holding piston operating within a fluid chamber in said hydraulically extensible strut, means connecting said clearance holding piston with the first of said brake shoes, said chamber in communication with said brake fluid actuating system, a wear compensating piston within said hydraulically extensible strut, means connecting said wear compensating piston with the second of said brake shoes, an adjusting screw threadedly engaging said wear compensating piston, said screw mounted concentrically within a prewound torsion spring connected to said screw and said wear compensating piston, said wear compensating piston mounted within said hydraulically extensible strut to extend relative to said screw when an excessive clearance exists between said brake shoes in said brake drum as said vehicle brakes are actuated.

4. An automatic brake adjuster for use with a vehicle drum brake comprising in combination, a vehicle drum brake including a rotating brake drum, two brake shoes for frictionally engaging the inner periphery of said brake drum, a hydraulic fluid brake actuating system, means for pressurizing fluid in said hydraulic fluid brake actuating system, hydraulic actuating means positioned between two ends of said two brake shoes, conduit means connecting said hydraulic means with said hydraulic fluid brake actuating system, an automatic brake adjuster for operation with said vehicle drum brake including, a valve means in said conduit means connecting said hydraulic actuating means with said hydraulic fluid brake actuating system, a hydraulically extensible strut positioned between the opposite two cooperative adjacent ends of said brake shoes, retraction means connecting said opposite two cooperative adjacent ends for maintaining a constant contact between the two ends of said hydraulically adjustable strut and brake shoes, conduit means connecting said hydraulic fluid brake actuating system with said hydraulically extensible strut, a pressure limiting valve in said conduit means connected to said hydraulically extensible strut, a clearance holding piston operating within a cylinder chamber in said hydraulically extensible strut and having a predetermined clearance between said piston and the end wall of said cylinder, means on said clearance holding piston engaging the first of said brake shoes, a wear compensating piston positioned in said hydraulically extensible strut and operating within a second cylinder chamber, means on said wear compensating piston engaging the second of said brake shoes, an adjustable screw and a prewound torsion spring connected to said wear adjusting piston, said torsion spring biasing said adjusting screw to an extended position relative to said wear compensating piston, said clearance holding piston providing a predetermined clearance between said brake shoes and said brake drum, said wear compensating piston providing the desired clearance adjustment with said adjusting screw when an excessive clearance exists between said brake shoes and said brake drum as the vehicle brakes are actuated.

5. An automatic brake adjuster for operation with a hydraulic vehicle drum brake comprising in combination, a hydraulic brake including a pair of brake shoes for frictionally engaging a rotating brake drum, a hydraulic fluid brake actuating system, means for pressurizing fluid in said hydraulic brake actuating system, hydraulic actuating means positioned between two of the ends of said brake shoes, conduit means for connecting said hydraulic actuating means with said hydraulic fluid brake actuating system, an automatic brake adjuster for use with said vehicle drum brake including a two-way check valve for requiring a predetermined actuating pressure to permit actuation of said hydraulic actuating means, a hydraulically extensible strut positioned between the opposite two cooperative and adjacent ends of said brake shoes, retraction means connecting said opposite two cooperative adjacent ends of said brake shoes for maintaining a constant contact and a biasing force between said opposite two cooperative adjacent ends of said brake shoes and said hydraulically extensible strut, conduit means connecting said hydraulically extensible strut with said hydraulic fluid brake actuating piston, pressure limiting valve operating within said conduit means leading to said hydraulically extensible strut, a clearance adjusting piston operating within a cylindrical chamber in said hydraulically extensible strut to provide a predetermined clearance between the end wall of said cylindrical chamber and said clearance holding piston, connecting means on said clearance piston engaging the first of said brake shoes, a wear compensating piston operating within a second cylindrical chamber in said hydraulically extensible strut, connecting means on said wear compensating piston engaging the second of said brake shoes, a screw member threadedly engaging the inner end of said wear compensating piston, a torsion spring connected to said screw member and said wear compensating piston biasing said screw member to an extended position relative to said wear compensating piston, passage means connecting said first cylindrical chamber and said second cylindrical chamber of said hydraulically extensible strut to said hydraulic fluid brake actuating system, said clearance holding piston providing a predetermined clearance between said brake shoes and said brake drum and said wear compensating piston providing an adjustment by extension of said screw member relative to said wear compensating piston when an excessive clearance exists between said brake shoes and said brake drum as said vehicle brakes are actuated.

6. An automatic brake adjuster for use with a vehicle drum brake comprising in combination, a vehicle drum brake including a rotating brake drum, a pair of brake shoes for frictionally engaging the inner periphery of said brake drum, a hydraulic fluid brake actuating system, means for pressurizing fluid within said hydraulic fluid brake actuating system, hydraulic actuating means positioned between two ends of said brake shoes, conduit means connecting said hydraulic actuating means with said hydraulic fluid brake actuating system, an automatic brake adjuster including a two-way check valve for maintaining a predetermined pressure in said hydraulic actuating means and requiring a predetermined actuating pressure in said hydraulic brake actuating means, a hydraulically extensible strut positioned between the opposite two cooperative adjacent ends of said brake shoes, retraction means connecting said two opposite cooperative adjacent ends of said brake shoes and maintaining constant contact and a biasing force between the opposite two cooperative adjacent ends of said brake shoes and said hydraulically extensible strut, conduit means connecting said hydraulic fluid brake actuating system and said hydraulically extensible strut, a pressure limiting valve positioned in said conduit means leading to said hydraulically extensible strut, a clearance holding piston operating within a cylindrical chamber of said hydraulically extensible strut, means connecting said clearance holding piston with the first of said brake shoes, said cylindrical chamber provided with a predetermined clearance between the end of said clearance holding piston and the end of said cylindrical chamber to provide a predetermined clearance between said brake shoes and said brake drum in their retracted position, a wear compensating piston operating within a second cylindrical chamber in said hydraulically extensible strut, means connecting said wear compensating piston with the second of said brake shoes, a screw member threadedly engaging said wear compensating piston, a prewound torsion spring connected to said screw member and said wear compensating piston biasing said wear compensating piston to an extended position relative to said wear compensating piston, passage means connecting said first cylindrical chamber to said second cylindrical chamber in said hydraulically extensible strut with said hydraulic fluid brake actuating system, said prewound torsion spring thereby providing an extendible biasing force to extend said adjusting screw to eliminate any excessive clearance between said brake shoes and said brake drum when said vehicle brakes are actuated.

7. An automatic brake adjuster for use in a hydraulically operated vehicle drum brake comprising in combination, a hydraulic fluid brake actuating system, means for pressurizing fluid within said hydraulic fluid brake actuating system, a vehicle drum brake having a brake drum, brake shoes for frictionally engaging said brake drum, hydraulic actuating means for engaging said brake shoes with said brake drum in communication with said hydraulic fluid brake actuating system, an automatic brake adjuster for use with said vehicle drum brake including, a hydraulically extensible strut positioned between two cooperative adjacent ends of said brake shoes, a spring connecting two of said cooperative adjacent ends of said brake shoes to maintain contact between said brake shoes and said hydraulically extensible strut, a clearance holding piston within said hydraulically extensible strut having a fluid chamber, a push rod connecting said clearance holding piston with the first of said two cooperative adjacent ends of said brake shoes, a wear compensating piston within said hydraulically extensible strut, an adjustable screw connected to said wear adjusting piston, means for extension of said screw relative to said wear compensating piston, a second push rod connecting said wear compensating piston with the second of said two cooperative adjacent ends of said brake shoes, conduit means connecting said hydraulically extensible strut to said hydraulic fluid actuating system, said clearance holding piston providing a predetermined clearance between said brake shoes and said brake drum in the retracted position and said wear compensating piston and said adjustable screw providing the predetermined brake adjustment when a predetermined clearance exists between said brake shoes and said brake drum when said vehicle brakes are actuated.

8. An automatic brake adjuster for operation in a hydraulically operated vehicle drum brake comprising in combination, a vehicle drum brake having a brake drum with brake shoes for frictionally engaging said brake drum, a hydraulic fluid brake actuating system, means for pressurizing fluid in said hydraulic fluid brake actuating system, a hydraulic actuating means positioned between said brake shoes for actuating said brake shoes in communication with said hydraulic fluid brake actuating system, an automatic brake adjuster for use with said vehicle drum brake including, a hydraulically extensible strut, conduit means connecting said hydraulic fluid brake actuating system with said hydraulically extensible strut, a clearance holding piston mounted concentrically within a fluid chamber in said hydraulically extensible strut, said fluid chamber communicating with said hydraulic fluid brake actuating system, means connecting said clearance holding piston with the first of said brake shoes, a wear compensating piston mounted concentrically within a second fluid chamber in said hydraulically extensible strut, said second chamber communicating with said hydraulic fluid brake actuating system, means connecting said wear compensating piston with the second of said brake shoes, said hydraulically extensible strut positioned between said brake shoes having resilient means for maintaining contact between said brake shoes and said hydraulically extensible strut, a screw member threadedly engaging said wear compensating piston, a torsion spring mounted on said screw member to bias said screw member to an extended position relative to said wear compensating piston when an excessive clearance exists between said brake shoes and said brake drum during the actuation of said vehicle brakes.

References Cited in the file of this patent
UNITED STATES PATENTS

| | | |
|---|---|---|
| 2,196,799 | Keplinger | Apr. 9, 1940 |
| 2,255,260 | Loweke | Sept. 9, 1941 |